United States Patent [19]

Dolamore Charles D.

[11] 3,749,941

[45] July 31, 1973

[54] SIGNAL GENERATOR FOR TELEPHONE SYSTEMS

[75] Inventor: Dolamore Charles D., Sheffield Village, Ohio

[73] Assignee: Lorain Products Corporation, Lorain, Ohio

[22] Filed: Oct. 14, 1970

[21] Appl. No.: 80,584

[52] U.S. Cl. .................... 307/271, 328/33, 328/61, 328/62, 328/65, 330/13, 331/42

[51] Int. Cl. .................... H03k 1/16

[58] Field of Search .................... 307/271, 270; 328/26, 33, 60, 61, 62, 65; 331/42, 43, 52, 37, 38, 39; 330/13

[56] References Cited

UNITED STATES PATENTS

| | | | |
|---|---|---|---|
| 2,848,616 | 8/1958 | Tollefson | 331/39 |
| 3,002,142 | 9/1961 | Jensen | 331/52 UX |
| 3,021,514 | 2/1962 | Regis et al. | 331/37 X |
| 3,281,703 | 10/1966 | Bladen | 330/13 |
| 3,437,945 | 4/1969 | Duncan | 330/13 |

*Primary Examiner*—Stanley T. Krawczewicz
*Attorney*—John Howard Smith

[57] ABSTRACT

A signal generator circuit for producing a plurality of output signals each including two sinusoidally varying a-c voltages of different frequencies. The circuitry includes a plurality of oscillator circuits each of which operates at a predetermined, precise frequency and each of which is directly coupled to not more than two amplifiers. The outputs of predetermined pairs of amplifiers are added in series to establish the desired mixed frequency output signals. While there is direct coupling between the oscillators and the amplifiers driven thereby, and while there is flow of a common component of current through amplifiers which operate at different frequencies, each mixed frequency output signal is substantially free of signal distorting frequency components.

7 Claims, 1 Drawing Figure

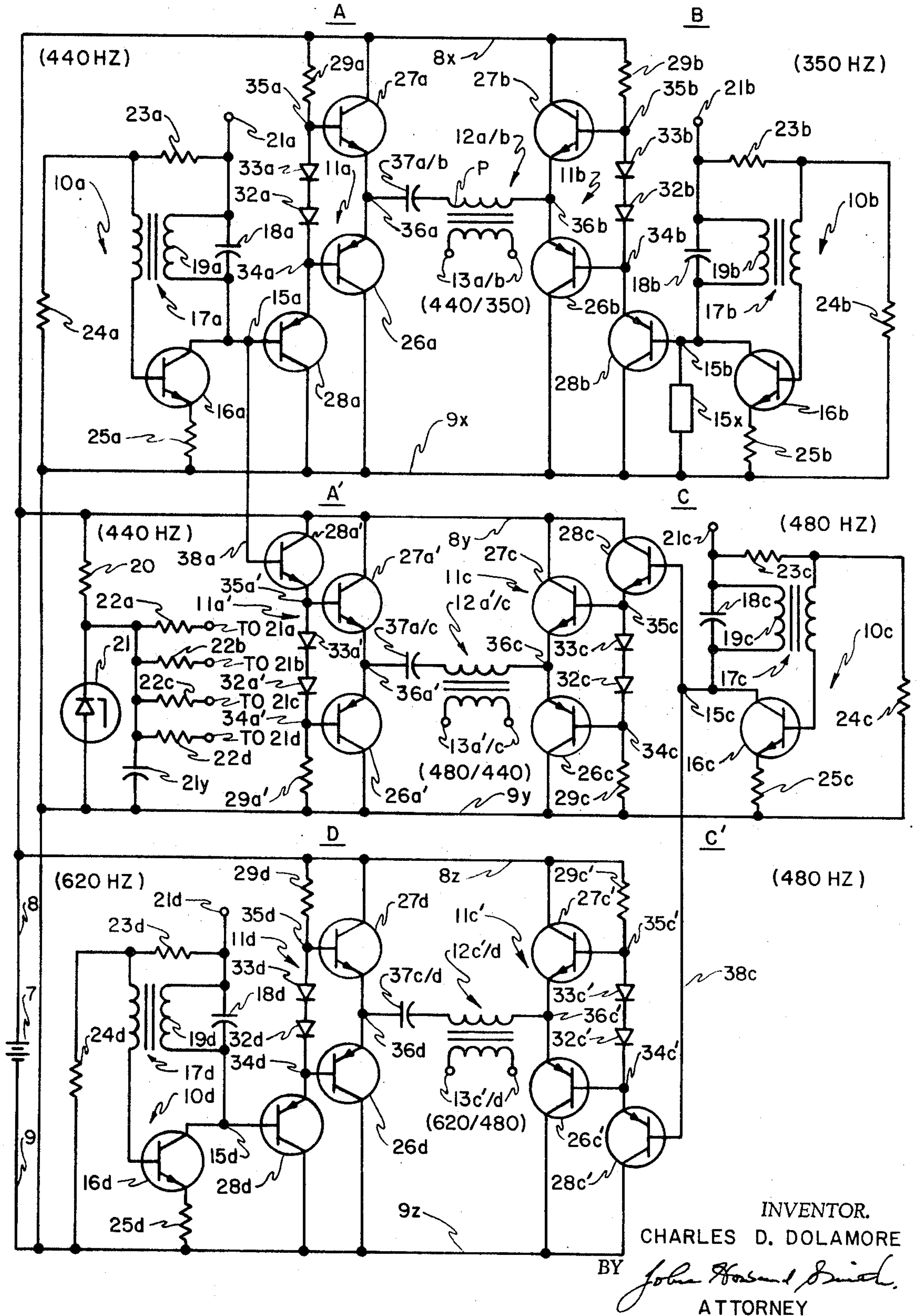
INVENTOR.
CHARLES D. DOLAMORE
BY
ATTORNEY

SIGNAL GENERATOR FOR TELEPHONE SYSTEMS

BACKGROUND OF THE INVENTION

The present invention relates to signal generator circuits for telephone systems and is directed more particularly to signal generator circuits which produce a plurality of output signals each including two sinusoidally varying a-c voltages of different frequencies.

It is telephone practice to inform a subscriber of the operative condition of the telephone system by establishing the proper one of a plurality of audible signals at his telephone set. If, for example, the line is idle when the subscriber lifts his handset, he will hear a dial tone. This dial tone is a 440 hertz signal mixed with a 350 hertz signal. Other signals include audible ringback tone, a 480 hertz signal mixed with a 440 hertz signal, and busy tone, a 620 hertz signal mixed with a 480 hertz signal. Because the 440 hertz signal is utilized in generating dial tone as well as audible ringback tone and because the 480 hertz signal is utilized in generating busy tone as well as audible ringback tone, the required subscriber signalling tones may be provided from four frequency generators, if there is provided suitable mixing circuitry for combining the separate a-c voltage signals into the desired mixed tones.

In the past, the generation of each of the mixed tones has been accomplished in three steps. First, the individual frequency components were generated in respective oscillator circuits. In a second step the output frequencies of two oscillators were added together in a mixing stage. Finally, in a third state, the mixed signal was amplified and applied to the output.

The above described type of signal generation presents several problems, especially in circumstances where the signal generation is to be used in a telephone system which utilizes precise tone signalling. First, the signal inputs of each mixer stage had to be substantially isolated from each other to prevent each oscillator from interfering with other oscillators and thereby introducing signal distorting components into each output signal. This required mixer stages of very high input impedance.

A second problem is that the mixer stage had to have a highly linear response. This is because any nonlinearly in the mixer stage would result in the appearance of distorting signal frequencies in the output of the mixer stage. These distorting signals result from the modulation of one input signal by the other and cannot be tolerated in a precise tone signalling system wherein proper circuit operation is dependent upon the presence of a limited number of precise, known frequencies each of which is utilized for a specific purpose.

A third problem was the presence of capacitive coupling between each oscillator and the mixer stages energized thereby and between the different amplifier stages. This capacitive coupling was thought necessary to prevent undesired interaction between the bias currents of the different oscillators and amplifiers when the signal generator was operated from a single d-c source. The problem was that, due to the low frequencies present in the circuit, the size and cost of the coupling capacitors were substantial.

SUMMARY OF THE INVENTION

Accordingly, it is an object of the invention to provide improved signal generator circuitry for telephone systems.

It is another object of the invention to provide a signal generator wherein the mixing of two signal frequencies to produce a mixed frequency output signal is accomplished by serially adding two a-c voltages of different frequencies.

Another object of the invention is to provide a signal generator including a plurality of oscillator circuits and a plurality of amplifiers driven thereby, the desired mixed frequency output signals being established by connecting the outputs of different amplifiers in series across a mixing element which is connected to the signal generator output.

Another object of the invention is to provide a signal generator for producing at least two mixed frequency output signals wherein at least one oscillator circuit drives two amplifiers each of which provides an a-c output voltage that is utilized in generating a respective mixed frequency output signal.

It is still another object of the invention to provide a signal generator of the above character in which each oscillator is directly coupled to the amplifiers driven thereby.

It is a further object of the invention to provide a signal generator of the above character wherein each mixed frequency output signal is sufficiently free of distortion that it may be utilized in precise tone signalling systems.

Another object of the invention is to provide a signal generator wherein each pair of amplifiers which are driven by a single oscillator have complementary drive elements, that is, wherein one of the amplifier inputs includes an NPN type semiconductor and the other amplifier input includes a PNP type semiconductor.

It is another object of the invention to provide a signal generator wherein the amplifiers which are driven by the same oscillator carry substantially the same bias current.

Still another object of the invention is to provide a signal generator wherein the amplifiers which are driven by the same oscillator draw only negligible bias currents from the oscillator in the presence of the direct coupling of both amplifiers thereto.

Generally speaking, the invention comprises a plurality of oscillator circuits each of which operates at a single frequency and each of which is directly coupled to one or more amplifiers. The output voltages of predetermined pairs of these amplifiers are added in series to establish the desired mixed frequency signal outputs. Since the amplifiers which are driven by the same oscillator are provided with complementary input elements, the bias current for one of the amplifier inputs flows from the source of d-c operating voltage through the other amplifier input. As a result, little or no bias current for either amplifier is drawn from the oscillator thus improving the a-c voltage waveform established thereby.

DESCRIPTION OF THE DRAWINGS

The single FIGURE is a schematic diagram of a circuit utilizing the principles of the invention.

DESCRIPTION OF THE INVENTION

Referring to the drawing, there are shown a-c sources A, A', B, C, C' and D each of which is adapted to produce a sinusoidally varying output voltage of a predetermined, precise frequency. The outputs of predetermined pairs of these a-c sources are added together in mixing transformers 12*a/b*, 12*a'/c* and 12*c'/d* to establish a plurality of mixed frequency output signals each of which includes two sinusoidally varying voltage components of different frequencies. Mixing transformer 12*a/b*, for example, establishes an output signal between output terminals 13*a/b* which is proportional to the sum of the sinusoidally varying output voltages of a-c sources A and B. Consequently, it will be seen that if, a-c sources A and A' establish 440 hertz outputs, source B establishes a 350 hertz output, sources C and C' establish 480 hertz outputs and source D establishes a 620 hertz output, the output voltages of mixing circuits 12*a/b*, 12*a'/c* and 12*c'/d* will be suitable for use as dial tone, audible ringback tone and busy tone of 440/350 hertz, 480/440 hertz and 620/480 hertz, respectively.

To the end that this may be accomplished, a-c sources A, A', B, C, C' and D each include an oscillator circuit which is designated by the numeral 10 followed by a letter that indicates the frequency of operation thereof and an amplifier circuit which is designated by the numeral 11 followed by a letter that indicates the frequency of operation thereof. A-C source A, for example, includes an oscillator circuit 10*a* and an amplifier circuit 11*a* responsive thereto. Because a-c sources A and A' operate at the same frequency, it is advantageous to include oscillator 10*a* within both of these sources but to provide separate amplifier circuits 11*a* and 11*a'* which establish the desired separate a-c output voltages therefrom.

To the end that oscillator circuit 10*a* may establish a sinusoidally varying output voltage at an output junction 15*a*, there are provided variable conducting means which here takes the form of an NPN transistor 16*a*, feedback means here shown as a transformer 17*a* and frequency determining means which here includes a capacitor 18*a* and the primary winding 19*a* of transformer 17*a*. In the present embodiment, the above elements are connected as a feedback oscillator of the tuned-collector type. It will be understood, however, that any oscillator circuit which generates an output signal of the desired sinusoidal waveform may be utilized in place of the oscillator shown in the drawing.

D-C operating voltage is provided to oscillator 10*a* from a common d-c source 7 through positive and negative busses 8 and 9, respectively. As will be described more fully later, it is desirable that the quiescent d-c voltage of the output of each oscillator circuit be approximately equal to the quiescent d-c voltage of the inputs of the amplifier circuits which are energized thereby. To assure that this condition will exist, a resistor 20 and a zener diode 21 having a breakdown voltage equal to the desired oscillator operating voltage are connected in series across d-c source 7 through conductors 8*y* and 9*y*. The voltage across zener diode 21 is distributed to oscillator circuits 10*a*, 10*b*, 10*c* and 10*d* through resistors 22*a*, 22*b*, 22*c* and 22*d*, respectively, which, together with a filter capacitor 21*y*, serve to prevent the signal from each oscillator affecting the operation of each other oscillator through their common supply of d-c operating voltage. The d-c operating voltages are distributed within oscillators 10*a*, 10*b*, 10*c* and 10*d* by voltage dividers including resistors 23*a* and 24*a*, 23*b* and 24*b*, 23*c* and 24*c* and 23*d* and 24*d*, respectively. The above voltages determine the magnitudes of the d-c components of the oscillator output voltages.

The operation of oscillator 10*a* will now be described. As power is first applied, a current flows from terminal 21*a* through resistor 23*a*, the secondary winding of transformer 17*a*, the base-emitter circuit of transistor 16*a* and an emitter resistor 25*a* to negative conductor 9*x*. This current renders transistor 16*a* conductive to a current from terminal 21*a* through the tank circuit including the primary winding 19*a* of transformer 17*a* and capacitor 18*a*, the collector-emitter circuit of transistor 16*a* and emitter resistor 25*a* to negative conductor 9*x*. The latter current induces a feedback voltage across the secondary winding of transformer 17*a* which increases the base-emitter current of transistor 16*a* and thereby further increases the collector-emitter current therethrough. As a result, the conduction of transistor 16*a* increases regeneratively, at a rate determined by the parameters of the tank circuit, until the voltage developed across emitter resistor 25*a* by the collector-emitter current is sufficient to prevent further increases in the base-emitter current. At this time, the polarity of the feedback voltage will reverse and the conduction of transistor 16*a* will begin to decrease regeneratively until the initial conductive condition thereof is restored whereupon the above activity repeats. It will be understood that the foregoing description is equally applicable to oscillators 10*b*, 10*c* and 10*d*.

During the course of the above described activity, the voltage between conductor 9*x* and junction 15*a* will vary sinusoidally about its quiescent value at a frequency determined by the parameters of the tank circuit. Because the oscillator circuit is designed so that the d-c component of the above voltage has a magnitude greater than the magnitude of the a-c component thereof, transistor 16*a* is not driven into the non-linear portions of its voltage-current characteristic during the course of an a-c cycle. As a result, the desired a-c voltage component is substantially free of distortion.

To the end that the sinusoidally varying voltage established by oscillator 10*a* may be amplified prior to being mixed with the sinusoidally varying voltage established by oscillator 10*b*, there is provided an amplifier 11*a*. In the present embodiment, amplifier 11*a* includes a pair of transistors 26*a* and 27*a* which are of complementary (PNP and NPN) semiconductor types. Because the amplifying activity shifts from one to the other of these transistors as the a-c input signal changes polarity, this type of amplifier may be said to have complementary symmetry. Amplifier 11*a* also includes an input or driving element here shown as a PNP transistor 28*a*, a current limiting resistor 29*a* and diodes 32*a* and 33*a*. The latter diodes serve to forward bias the base-emitter circuits of transistors 26*a* and 27*a* as amplifier bias current flows from conductor 8*x* through resistor 29*a*, diodes 33*a* and 32*a* and the base-emitter circuit of transistor 28*a*.

When the instantaneous voltage between conductor 9*x* and junction 15*a* has a magnitude equal to the magnitude of the d-c component of the voltage therebetween, the currents through transistors 26*a*, 27*a* and 28*a* are at their quiescent or no-signal values and the potential of junction 36*a* is approximately mid-way between the potential of conductors 8*x* and 9*x*. It will be seen, therefore, that if the quiescent potential of the collector of transistor 16*a* is made substantially equal to the quiescent potential of the base of transistor 28*a* (which is, in turn, equal to the quiescent voltage of junction 36*a* less quiescent base-emitter voltage drops of transistors 26*a* and 28*a*) it is not necessary to provide a coupling capacitor therebetween. This is because, under the above conditions, the d-c potential of the output of oscillator 10*a* will be equal to the d-c potential of the input of amplifier 11*a*. As mentioned previously, this condition may be achieved by selecting a zener diode 21 having a breakdown voltage which will establish a suitable d-c operating voltage for oscillator 10*a*.

During the positive half-cycle of the a-c voltage from oscillator 10*a*, the instantaneous voltage between conductor 9*x* and junction 15*a* exceeds the d-c component of the voltage therebetween. This reduces the conduction of transistor 28*a* and thereby raises the potential between conductor 9*x* and drive junctions 34*a* and 35*a*. Under these conditions, transistor 27*a* conducts more heavily than transistor 26*a* and the potential of junction 36*a* rises toward that of conductor 8*x*. It will be understood that the difference between the collector-emitter current of transistor 27*a* and the emitter-collector current of transistor 26*a* flows through mixing circuit 12*a*/*b* and amplifier 11*b* to conductor 9*x*.

During the negative half-cycle of the a-c voltage from oscillator 10*a*, the instantaneous voltage between conductor 9*x* and junction 15*a* falls below the d-c component of the voltage therebetween. This increases the conduction of transistor 28*a* and thereby lowers the potential between conductor 9*x* and drive junctions 34*a* and 35*a*. Under these conditions, transistor 26*a* conducts more heavily than transistor 27*a* and the potential of junction 36*a* falls toward that of conductor 9*x*. It will be understood that the difference between the emitter-collector current of transistor 26*a* and the collector-emitter current of transistor 27*a* flows through amplifier 11*b* and mixing circuit 12*a*/*b* from conductor 8*x*. It will be understood that the foregoing description is equally applicable to amplifiers 11*b*, 11*c'* and 11*d*.

From the foregoing, it will be seen that a sinusoidally varying voltage having a frequency determined by the parameters of oscillator circuit 10*a* appears between conductor 9*x* and junction 36*a* and that a sinusoidally varying voltage having a frequency determined by the parameters of oscillator circuit 10*b* appears between conductor 9*x* and junction 36*b*. Because the d-c components of the above voltages are substantially equal and opposite and add algebraically around the loop including conductor 9*x*, transistors 26*a* and 26*b* and the primary winding P of mixing transformer 12*a*/*b*, negligible d-c voltage appears across primary winding P. If there should be an unbalanced d-c voltage, it may be blocked by a d-c blocking capacitor 37*a*/*b*. The a-c components of the above voltages also add algebraically around the above loop, but do not cancel each other. This is because the a-c voltages are of different frequencies and, therefore, can have no fixed (subtractive) phase relationship. Thus, an a-c voltage having two discrete, sinusoidally varying voltage components appears between output terminals 13*a*/*b*.

While the current in either direction through primary winding P must flow through amplifier 11*a* as well as amplifier 11*b*, I have found that the output voltage of amplifier 11*a* is substantially unaffected by the presence of amplifier 11*b* and vice-versa. As a result, even though the output of a-c source A is, in effect, connected in series with the output of a-c source B across a mixing element 12*a*/*b* having a linear input-output voltage characteristic and a potentially low series impedance, the circuit of the invention is substantially free of crossover and distortion.

To the end that oscillator 10*a* may be utilized in conjunction with oscillator 10*c* in producing a mixed frequency output signal at output 13*a'*/*c*, there is provided an amplifier 11*a'*. This amplifier is similar to amplifier 11*a*, circuit elements of the former being distinguished from like functioning circuit elements of the latter by a prime. Amplifier 11*a'* differs from amplifier 11*a* in that the driving element of the former is an NPN transistor 28*a'* which is connected between positive conductor 8*y* and upper drive junction 36*a'* while the driving element of amplifier 11a is a PNP transistor 28a which is connected between negative conductor 9*x* and lower drive junction 34*a*. As will be described more fully presently, the utilization of these complementary driving elements allows oscillator 10*a* to be directly coupled to both of the above amplifier circuits without giving rise to the flow of disruptive amplifier bias currents.

In the absence of amplifier 11*a'*, the bias current for amplifier 11a would flow from conductor 8*x* through resistor 29*a*, diodes 33*a* and 32*a*, the base-emitter circuit of transistor 28*a* and the collector-emitter circuit of oscillator transistor 16*a* to conductor 9*x*. Similarly, in the absence of amplifier 11*a*, the bias current for amplifier 11*a'* would flow from terminal 21*a*, through the oscillator tank circuit, a conductor 38*a*, the base-emitter circuit of transistor 28*a'*, bias voltage developing diodes 33*a'* and 32*a'* and resistor 29*a'* to conductor 9*y*. When both amplifiers are present simultaneously, however, the bias current flowing into oscillator 10*a* from amplifier 11*a* is substantially cancelled by the bias current flowing out of oscillator 10*a* through amplifier 11*a'*. As a result, although oscillator 10*a* is directly coupled to amplifiers 11*a* and 11*a'*, only negligible bias current is drawn therethrough. This eliminates the need for drawing amplifier bias current through the oscillator tank circuit as well as the need for producing amplifier bias current through the oscillator transistor and thereby results in a more nearly sinusoidal oscillator output voltage waveform.

While it is desirable to eliminate the distorting effect of both of the above biasing currents through oscillator 10*a*, it is more important to eliminate the amplifier bias current which flows through the oscillator tank than to eliminate the amplifier bias current which flows through the oscillator transistor. This is because the distorting effect of the former is much larger than the distorting effect of the latter. Since the distorting effects of both of the above amplifier bias currents are eliminated for those oscillators such as 10*a* which drive two amplifiers and since the distorting effect of only one of the above amplifier bias currents will be eliminated for those oscillators such as 10*b* which drive only one amplifier, the output waveform from oscillators of the former type may be more nearly sinusoidal than the output waveform from oscillators of the latter type.

Accordingly, it may be desirable to simulate the presence of a second amplifier for those oscillators such as 10_b_ and 10_d_ which drive only one amplifier. This may be accomplished by determining the input impedance of the second amplifier and connecting such impedance across the oscillator output as indicated at 15_x_. If, however, the amplifier which is present is connected so that the bias current drawn thereby flows through only the transistor of the driving oscillator (as shown for amplifiers 11_a_, 11_b_, 11_c_' and 11_d_), this extra impedance may be unnecessary.

If it should be desirable to provide a fourth mixed frequency output signal, this may be accomplished by providing additional amplifiers for oscillators 10_b_ and 10_d_ and connecting the outputs of the added amplifiers in series across a mixing transformer in the manner previously described. Alternatively, additional oscillators and amplifiers may be added to expand the circuit in accordance with the pattern shown in the drawing.

From the foregoing it will be seen that a signal generator constructed in accordance with the invention is adapted to produce a plurality of mixed frequency output signals each including two sinusoidally varying voltage components of different frequencies and low harmonic content. It will further be seen that this is accomplished by serially adding the output voltages of two a-c sources each of which includes directly coupled circuitry.

It will be understood that the above embodiment is for explanatory purposes only and may be changed or modified without departing from the spirit and scope of the appended claims.

What is claimed is:

1. In a signal generator for providing a plurality of output signals each of which varies in accordance with the sum of two a-c voltages of different frequencies, in combination, a power source, a plurality of oscillators, means for connecting said power source in energizing relationship to said oscillators, a plurality of amplifiers each having an input and an output, means for connecting said power source in energizing relationship to said amplifiers, means for connecting each of said oscillators in signal supplying relationship to the inputs of predetermined ones of said amplifiers, at least two of said amplifiers being driven by the same oscillator, a plurality of mixing means each having input means and output means, means for connecting the outputs of two of said amplifiers in series across the input means of each of said mixing means and means for connecting the output means of each of said mixing means to a respective output of the signal generator.

2. In a signal generator for providing a plurality of output signals each of which varies in accordance with the sum of two a-c voltages of different frequencies, in combination, a power source, a plurality of oscillators, means for connecting said power source in energizing relationship to said oscillators, a plurality of amplifiers each having an input and an output, means for connecting said power source in energizing relationship to said amplifiers, means for connecting each of said oscillators in signal supplying relationship to the inputs of predetermined ones of said amplifiers, at least two of said amplifiers being driven by the same oscillator, a plurality of mixing transformers means each having a primary winding and a secondary winding, means for connecting the outputs of two of said amplifiers in series across the primary winding of each of said mixing transformers and means for connecting the secondary windings of said mixing transformers to respective outputs of the signal generator.

3. A signal generator as set forth in claim 2 in which each of said oscillators includes variable conducting means having a power circuit and a control circuit, feedback means for controlling the electrical condition of said control circuit in accordance with the electrical condition of said power circuit, means for connecting said feedback means to said power and control circuits, frequency controlling means and means for connecting said frequency controlling means to said feedback means.

4. A signal generator as set forth in claim 2 in which each of said amplifiers includes first and second variable conducting means of complementary semiconductor types, said variable conducting means each including a power circuit and a control circuit, means for connecting the power circuits of said variable conducting means in series across said power source, means for connecting the control circuits of said variable conducting means to the input of the respective amplifier and means for connecting the power circuits of said variable conducting means to the output of the respective amplifier.

5. A signal generator as set forth in claim 2 in which each of said amplifiers is a complementary symmetry amplifier having first and second drive junctions and in which said means for connecting each of said oscillators in signal supplying relationship to the inputs of predetermined ones of said amplifiers includes drive means and means for connecting said drive means between said oscillator means and predetermined ones of said drive junctions.

6. A signal generator as set forth in claim 5 wherein the drive means for those amplifiers which are driven by the same oscillator are of complementary semiconductor types.

7. A signal generator as set forth in claim 2 in which each of said oscillators is directly coupled to each amplifier driven thereby and wherein those amplifiers which are driven by the same oscillator draw mutually cancelling bias currents therefrom.

* * * * *